(12) United States Patent
Jackson et al.

(10) Patent No.: US 8,857,700 B2
(45) Date of Patent: Oct. 14, 2014

(54) LOW TEMPERATURE METHOD FOR FORMING FIELD JOINTS ON UNDERSEA PIPELINES

(75) Inventors: Adam Jackson, Trondheim (NO); Geir Melvold Østby, Svorkmo (NO); Peter Jackson, Toronto (CA)

(73) Assignee: ShawCor Ltd., Toronto, Ontario (CA)

(*) Notice: Subject to any disclaimer, the term of this patent is extended or adjusted under 35 U.S.C. 154(b) by 183 days.

(21) Appl. No.: 12/794,402

(22) Filed: Jun. 4, 2010

(65) Prior Publication Data

US 2011/0297316 A1    Dec. 8, 2011

(51) Int. Cl.
  *B23K 28/00*    (2006.01)
  *B23P 19/04*    (2006.01)
  *B29C 45/14*    (2006.01)

(52) U.S. Cl.
  CPC ..... *B29C 45/14336* (2013.01); *B29C 45/14598* (2013.01); *B29C 2045/14877* (2013.01)
  USPC ............................................. 228/199; 29/460

(58) Field of Classification Search
  CPC combination set(s) only.
  See application file for complete search history.

(56) References Cited

U.S. PATENT DOCUMENTS

| | | | | |
|---|---|---|---|---|
| 2,930,406 | A * | 3/1960 | Galloway | 285/55 |
| 3,731,710 | A * | 5/1973 | Bauer et al. | 138/143 |
| 3,929,166 | A | 12/1975 | Westerheid | |
| 4,162,093 | A | 7/1979 | Sigmund | |
| 4,510,007 | A * | 4/1985 | Stucke | 156/244.12 |
| RE32,103 | E * | 4/1986 | Struve | 156/153 |

(Continued)

FOREIGN PATENT DOCUMENTS

| | | |
|---|---|---|
| CA | 931488 | 8/1973 |
| CA | 2253225 | 9/1999 |

(Continued)

OTHER PUBLICATIONS

Guttmann, "Concise Guide to Structual Adhesives", 1961, Reinhold Publishing Corporation, p. 34-38.*

(Continued)

*Primary Examiner* — Devang R Patel
*Assistant Examiner* — Carlos Gamino
(74) *Attorney, Agent, or Firm* — DeLio, Peterson & Curcio, LLC; Peter W. Peterson; Thomas E. Ciesco

(57) ABSTRACT

A method for forming a field joints between sections of coated or insulated pipe which are to be welded together and incorporated into an undersea pipeline for carrying single or multi-phase fluids such as oil, gas and water. The method includes the application of a liquid epoxy layer which overlaps a lip of the factory-applied FBE coating protruding beyond a chamfered end of the factory-applied insulation layer, and which may be applied over the entire weld joint area. The liquid epoxy layer is partially cured by application of heat, and a layer of powdered adhesive is applied onto the partially cured liquid epoxy layer. The adhesive is subsequently sintered and activated by application of heat to its outer surface. The outer surfaces of the adhesive layer and the chamfers are then preheated and the thermal joint insulation is injection molded over the entire joint area. Throughout the entire method the temperature of the factory-applied FBE coating is maintained below its glass transition temperature so as to avoid weakening the bond between the FBE coating and the underlying steel pipe. The number and sequence of steps can be varied, depending at least partly on whether the liquid epoxy and adhesive layers are applied in a pipe coating facility or in the field.

15 Claims, 5 Drawing Sheets

(56) References Cited

U.S. PATENT DOCUMENTS

| | | | |
|---|---|---|---|
| 5,026,451 A | | 6/1991 | Trzecieski et al. |
| 5,723,199 A | * | 3/1998 | Boot .................... 428/158 |
| 6,065,781 A | | 5/2000 | Titus |
| 6,165,302 A | * | 12/2000 | Marzola et al. ............ 156/94 |
| 6,177,516 B1 | * | 1/2001 | Hudak ..................... 525/71 |
| 6,264,871 B1 | | 7/2001 | Mullen et al. |
| 6,294,597 B1 | * | 9/2001 | Rinde et al. ............. 523/442 |
| 6,440,245 B1 | * | 8/2002 | Culzoni et al. ............. 156/94 |
| 6,478,921 B1 | * | 11/2002 | Thulin ..................... 156/252 |
| 6,505,650 B2 | | 1/2003 | Bohon et al. |
| 6,736,430 B1 | | 5/2004 | Meulemans et al. |
| 6,843,950 B1 | | 1/2005 | Mally et al. |
| 7,344,161 B2 | | 3/2008 | Howard et al. |
| 7,790,288 B2 | * | 9/2010 | Perez et al. ............... 428/416 |
| 8,017,701 B2 | * | 9/2011 | McElvain et al. ........... 526/67 |
| 8,397,765 B2 | * | 3/2013 | Jackson et al. ........... 138/149 |
| 2002/0083993 A1 | | 7/2002 | Bohon et al. |
| 2007/0036982 A1 | * | 2/2007 | Perez et al. ............... 428/416 |
| 2008/0079260 A1 | | 4/2008 | Duncan |
| 2008/0136169 A1 | | 6/2008 | Duncan |
| 2008/0286514 A1 | | 11/2008 | Lam et al. |
| 2009/0159146 A1 | | 6/2009 | Jackson et al. |
| 2010/0043906 A1 | | 2/2010 | Jackson et al. |
| 2010/0254687 A1 | | 10/2010 | George et al. |

FOREIGN PATENT DOCUMENTS

| | | |
|---|---|---|
| CA | 2273130 | 11/1999 |
| CA | 2708687 | 7/2009 |
| CA | 7311153 | 1/2010 |
| CA | 2647967 | 6/2010 |
| DE | 2241655 | 3/1973 |
| EP | 1473506 | 3/2004 |
| GB | 1368665 | 10/1974 |
| GB | 2462149 | 2/2010 |
| WO | WO8911618 | 11/1989 |
| WO | WO2009027686 | 3/2009 |
| WO | WO2009058715 | 5/2009 |
| WO | WO2009079784 | 7/2009 |
| WO | WO2010069049 | 6/2010 |

OTHER PUBLICATIONS shrinksleeves.com, "E-PRimer", "S-Primer", "GTS-65 (3-Layer)", Dec. 3, 2008.*

Canusa—CPS, E Primer—website printout dated Apr. 6, 2010 including Product Data Sheet, 3 pages, date unknown.

Canusa—CPS, S Primer—Product Data Sheet, 2 pages, date unknown.

Canusa—CPS, P Primer—website printout dated Apr. 26, 2010 including Product Data Sheet, 3 pages, date unknown.

* cited by examiner

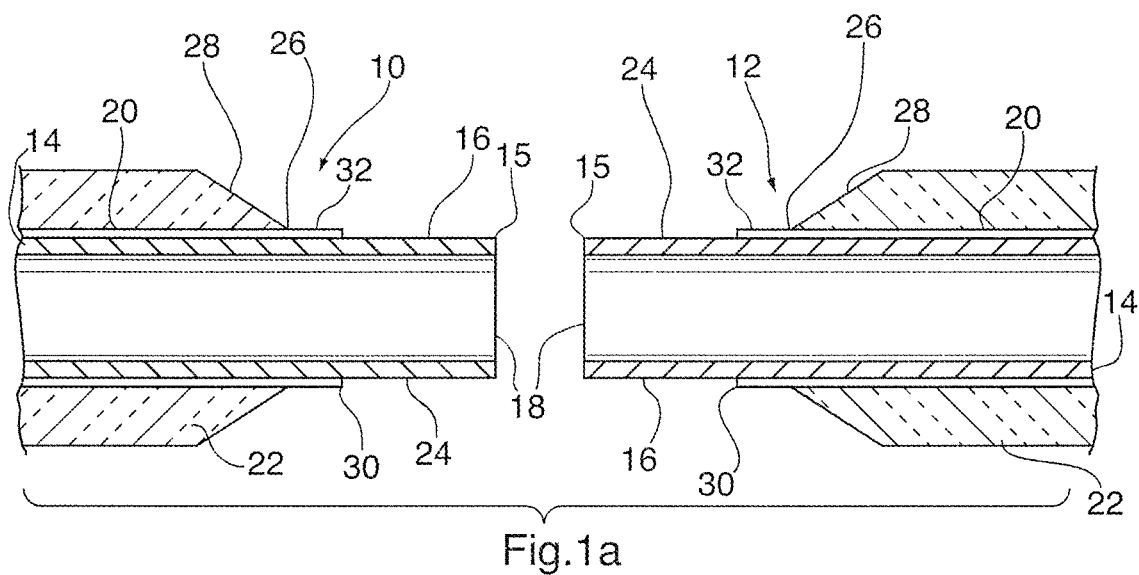
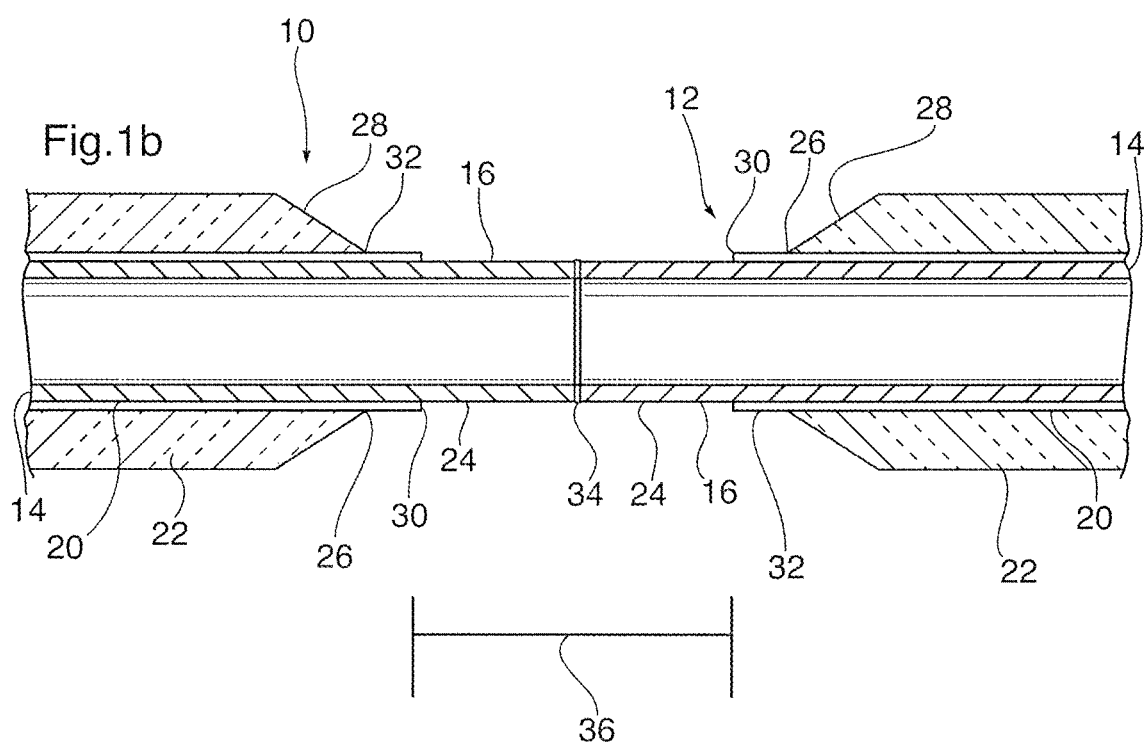

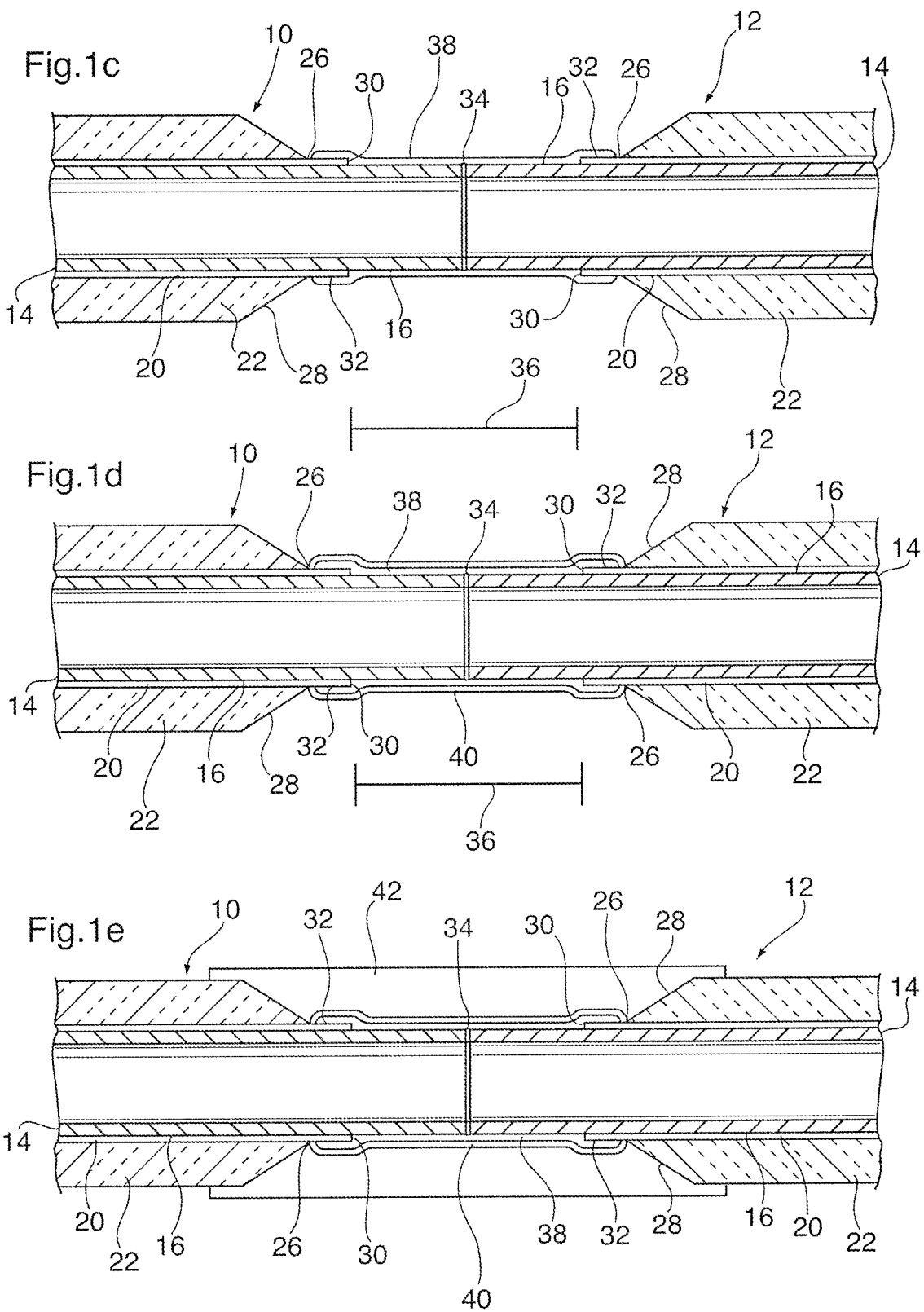

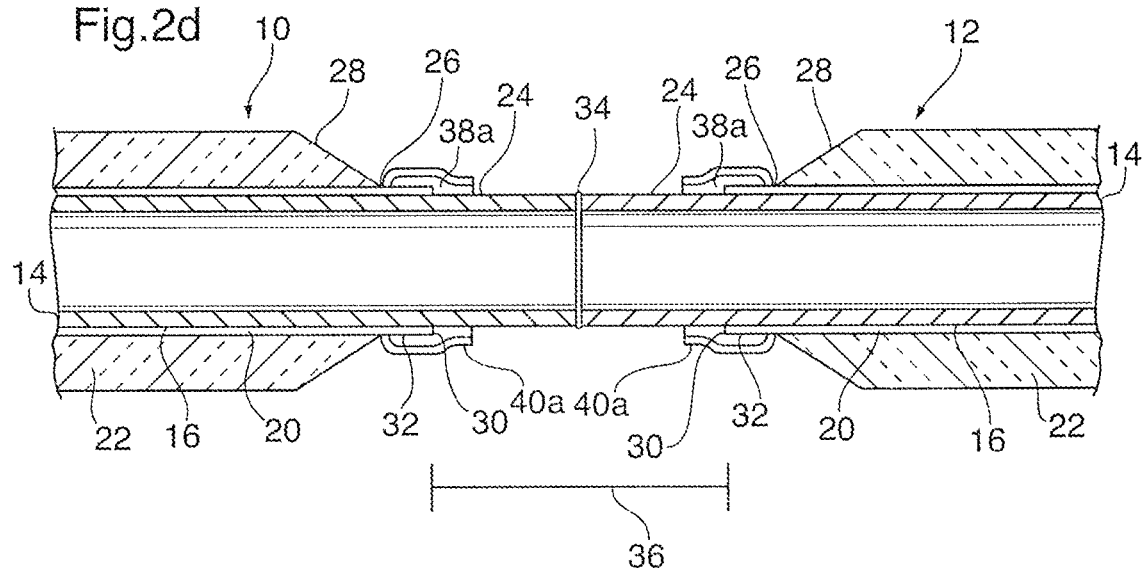
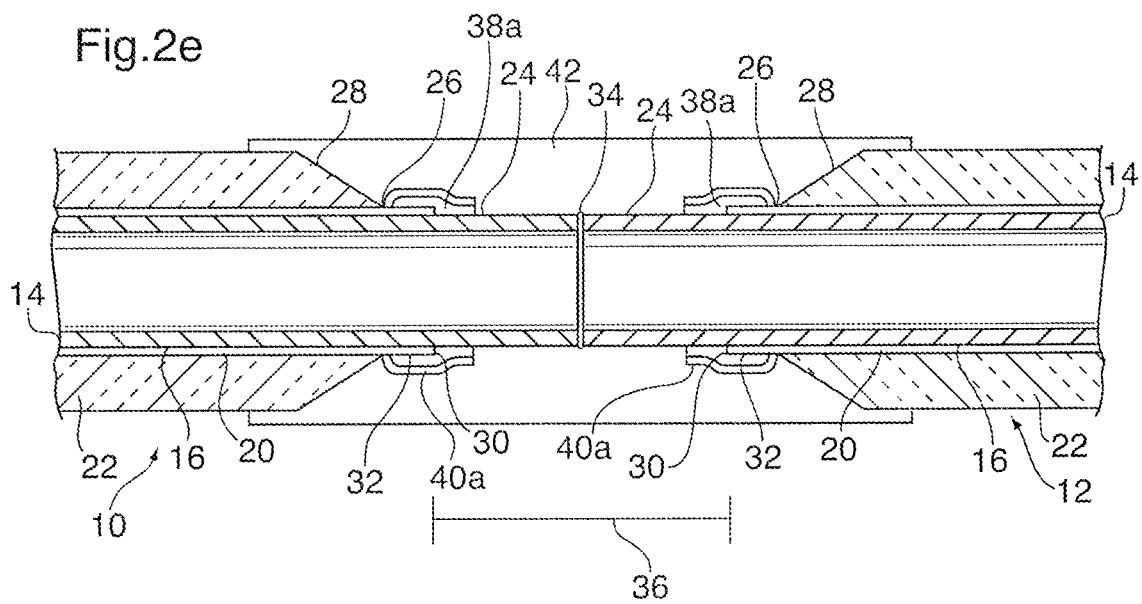

LOW TEMPERATURE METHOD FOR FORMING FIELD JOINTS ON UNDERSEA PIPELINES

FIELD OF THE INVENTION

This invention relates to corrosion protection, mechanical protection and insulation of welded joints between sections of coated pipe which are to be incorporated into an undersea pipeline for carrying single or multi-phase fluids such as oil, gas and water.

BACKGROUND OF THE INVENTION

Generally speaking, pipelines are formed from sections of steel pipe having factory-applied corrosion protection and insulating coatings. In a typical construction, the pipes are provided with at least two functional layers; an inner corrosion protection coating comprised of for example fusion-bonded epoxy ("FBE"), and an outer layer formed from a thermoplastic such as polypropylene or polyethylene. The insulating layer may be foamed or unfoamed.

In the manufacture of coated/insulated pipe, the ends of the pipe must be left bare so as to prevent damage to the coating when the pipes are joined in the field by welding. Typically, the coating is cut back from the end of the pipe to form a chamfer which is spaced from the end of the pipe. A lip of the epoxy undercoating may protrude beyond the end (or "toe") of the chamfer. The chamfering step is typically performed in the factory as part of the manufacturing process.

The individual pipe sections are joined together in the field to form a continuous pipeline. The joints between the pipe sections are known as "field joints", and are formed by butt welding the pipe sections together, and then applying a layer of coating/insulation over the bare pipe surrounding the weld joint. These steps may be performed as the pipeline is being reeled onto or from a lay vessel (so called "tie-in joints"), during pre-fabrication of multi-jointed pipe strings, or immediately before laying of the pipeline. For reasons of economy, field joints must be rapidly formed and cooled to an acceptable temperature so as not to slow down the reeling or laying operation. For example, reeling of the pipeline is generally not permitted unless the temperature of the field joint and associated steel is below about 100 degrees Celsius, typically below about 80 degrees Celsius.

There are numerous methods for formation of field joints. In one method known to the inventors, a corrosion protection coating of FBE is provided over the bare pipe surrounding the weld joint. The joint area is then heated to about 180-250 degrees Celsius to cure the FBE, and the insulating/coating layer is then applied over the heated joint area by injection molding.

Heating of the pipe joint to cure the FBE causes portions of the existing, factory-applied FBE coating to be heated above its glass transition temperature. The glass transition temperature is the temperature at which the FBE transforms from a hard state to a softened, rubber-like state, and is in the range from about 100 to 160 degrees Celsius. More typically, the glass transition temperature of commonly used low temperature FBEs is in the range from 100-110 degrees Celsius. The inventors have found that heating the FBE coating above its glass transition temperature can weaken the bond between the factory-applied FBE coating and the steel pipe in the region of the chamfer toe. This results in the formation of a discontinuous structure under the chamfer toe which may fail during reeling or subsequent laying of the pipeline.

Another disadvantage of this method is that a significant amount of time is required to preheat the pipe to 180-250 degrees Celsius and then cool the pipe and the applied field joint insulation system to 100 degrees Celsius or lower. Where the pipeline is being reeled onto a lay barge, for example, this additional heating and cooling time is costly as it slows the reeling process and increases lay vessel wait time.

Therefore, the need exists for a method for applying field joints to insulated pipelines which avoids excessive heating of the pipe joint area.

SUMMARY OF THE INVENTION

The invention provides a method for forming a field joint between two insulated pipe sections. Each of the insulated pipe sections comprises (i) a steel pipe having an outer surface and an end, wherein an annular connection surface is located at said end of the steel pipe, (ii) a layer of a fusion bonded epoxy (FBE) provided over the outer surface of the steel pipe, wherein the FBE has a glass transition temperature and wherein a terminal end of the FBE layer is spaced from the end of the pipe; and (iii) a pipe insulation layer provided over the FBE layer, wherein the pipe insulation layer comprises a polymeric thermal insulation material, wherein a terminal end of the pipe insulation layer is spaced from the end of the pipe. Each of the insulated pipe sections has a bare end portion in which the outer surface of the steel pipe is exposed, the bare end portion extending from the end of the steel pipe to the terminal end of either the FBE layer or the pipe insulation layer.

One step of the method comprises welding the steel pipe of the first insulated pipe section to the steel pipe of the second insulated pipe section, so as to form a circumferential weld joint between the annular connection surfaces of the steel pipes, and so as to form a continuous joint area which includes the circumferential weld joint and the bare end portions of the insulated pipe sections.

Another step of the method comprises applying a layer of liquid epoxy to at least those portions of the bare end portions which are proximate to the terminal ends of the FBE layers of the first and second insulated pipe sections, such that the liquid epoxy layer is in contact with the FBE layer of both of the insulated pipe sections. The liquid epoxy layer is partially cured by heating the liquid epoxy layer, wherein a temperature of the steel pipe and the FBE layer are maintained at a temperature below the glass transition temperature.

Another step of the method comprises applying a layer of an adhesive over the liquid epoxy layer and in contact therewith. The adhesive layer is subsequently heated, while maintaining the steel pipe and the FBE layer at a temperature below the glass transition temperature.

Another step of the method comprises applying a continuous layer of joint insulation over the joint area, wherein the layer of joint insulation is in contact with the adhesive layer and overlaps with the terminal end of the pipe insulation layer of both the first and the second insulated pipe sections.

In an embodiment of the invention, a distance between the terminal end of the FBE layer and the end of the steel pipe is less than a distance between the terminal end of the pipe insulation layer and the end of the steel pipe, such that an exposed end portion of the FBE layer is provided between the terminal ends of the pipe insulation layer and the FBE layer. The bare end portion of each of the insulated pipe sections may extend from the end of the steel pipe to the terminal end of the FBE layer. The joint area may extend between the terminal end of the FBE layer of the first insulated pipe section and the terminal end of the FBE layer of the second insulated pipe section. The liquid epoxy layer may be applied over the exposed end portion of the FBE layer so as to at least partly cover said exposed portion of the FBE layer.

In an embodiment of the invention, the liquid epoxy layer is applied over and substantially completely covers the exposed end portions of the FBE layer in both of said insulated pipe sections. The liquid epoxy layer may comprise a continuous layer which is applied so as to substantially completely cover the joint area.

In an embodiment of the invention, the terminal end of the pipe insulation layer in each of the insulated pipe sections is provided with a chamfer, wherein a toe of the chamfer is located at the terminal end of the pipe insulation layer, and the chamfer extends radially outwardly from the toe in a direction away from the end of the steel pipe. The liquid epoxy layer may be applied so as to avoid substantial overlap with the chamfer of the pipe insulation layer.

In an embodiment of the invention, the liquid epoxy layer is partially cured by preheating the steel pipe prior to application of the liquid epoxy to a temperature within the range from about 40-100 degrees Celsius. As a result of this preheating, the outer surface of the partially cured liquid epoxy layer is in a tacky, gel-like state prior to and during application of the adhesive layer.

In an embodiment of the invention, the adhesive is applied to the liquid epoxy layer in solid, particulate form, and wherein the adhesive layer is heated prior to a sufficient temperature to melt and coalesce the particles while maintaining the steel pipe and the FBE layer at a temperature below the glass transition temperature. For example, the adhesive layer may be heated to a temperature in the range of about 100-160 degrees Celsius to melt and coalesce said particles.

In an embodiment of the invention, the outer surface of the adhesive layer is preheated immediately prior to the step of applying the joint insulation, and may be preheated to about 100-160 degrees Celsius.

In an embodiment of the invention, the joint insulation layer is applied by injection molding. The joint insulation layer may comprise a polymer selected from the group consisting of homopolymers of polyethylene, polypropylene or polystyrene, and copolymers of polyethylene, polypropylene or polystyrene. The polymer comprising the joint insulation layer may be the same as the polymeric thermal insulation material of the pipe insulation layer.

In an embodiment of the invention, the application of the liquid epoxy layer and the adhesive layer precedes the welding of the steel pipes. In this embodiment, the liquid epoxy layer may be discontinuous and may be applied only to the portions of the bare end portions which are proximate to the terminal ends of the FBE layers, so as to avoid excessive heating of the liquid epoxy layer and the adhesive layer during welding. The welding of the steel pipes may precede the heating of the adhesive layer.

BRIEF DESCRIPTION OF THE DRAWINGS

The invention will now be described, by way of example only, with reference to the accompanying drawings in which:

FIGS. 1a to 1e illustrate the steps of a method for forming a field joint according to a first embodiment of the invention;

FIGS. 2a to 2e illustrate the steps of a method for forming a field joint according to a second embodiment of the invention.

DETAILED DESCRIPTION

Figure 2A:
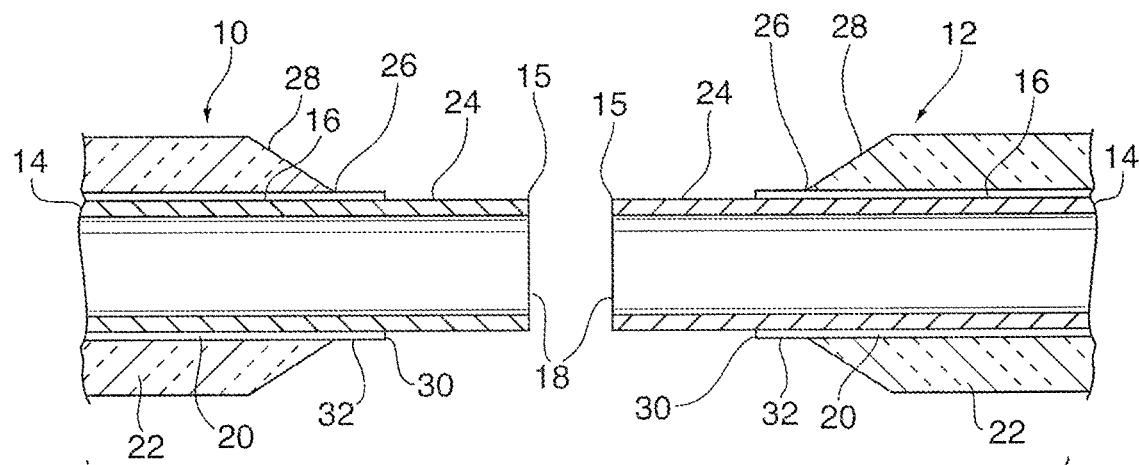

A number of methods according to the invention are now described below with reference to the drawings.

The methods according to the invention include a number of steps which are performed in the field, as individual sections of insulated pipe are joined together to form a continuous pipeline. As mentioned above, these steps are typically performed as the pipeline is reeled onto a lay vessel, during pre-fabrication of multi-jointed pipe strings or as it is being laid, i.e. unreeled, from a lay vessel. The steps which are performed in the field are sometimes referred to herein as "on-line" steps.

Some of the methods according to the invention also include steps which are performed as an integral part of the pipe-coating process, and may therefore be performed in a factory or other facility where the corrosion protection and insulation coatings are applied to individual sections of pipe. These steps are sometimes referred to herein as "off-line" steps. It will be appreciated that the number and sequence of steps in the methods according to the invention may vary according to which steps are performed "off-line" and which steps are performed "on-line".

A method according to a first embodiment of the invention is now described with reference to FIGS. 1a to 1e. All of the steps of the method according to the first embodiment are performed on-line, i.e. in the field.

FIG. 1a illustrates the end portions of a first insulated pipe section 10 and a second insulated pipe section 12 to be joined and provided with a field joint according to a first embodiment of the invention. Each insulated/coated pipe section 10 or 12 may comprise a single length of insulated/coated pipe, as supplied from a factory, or a partially assembled pipeline comprising a plurality of pipe sections welded together end-to-end. The pipe sections 10 and 12 are of a typical construction, as would be obtained from a pipe coating facility. As the end portions of the first and second pipe sections 10, 12 shown in the drawings are of identical construction, the same reference numerals will be used below and in the drawings to identify their common elements.

Each pipe section 10, 12 has a layered construction, and includes a steel pipe 14 having a cylindrical outer surface 16. The end 15 of the pipe 14 has an annular connection surface 18 which is at a right angle to the outer surface 16.

Each insulated pipe section 10, 12 also includes a plurality of factory-applied functional coatings or layers provided on the outer surface 16 of the steel pipe 14. The pipe sections 10, 12 are described herein as having a simple layered construction, with a single corrosion protection layer 20 provided over the outer surface 16 of steel pipe 14 and in contact therewith, and a single pipe insulation layer 22 provided over the corrosion protection layer 20.

It will be appreciated that other functional layers may be integrated into the structure of insulated/coated pipe sections 10, 12 without departing from the scope of the present invention. For example, insulated pipe sections 10, 12 may include more than one corrosion protection layer or more than one layer of pipe insulation. In addition, insulated/coated pipe sections 10, 12 may include other types of functional layers, such as adhesive layers and outer abrasion-resistant top coats. Some of these additional functional layers may be located between the corrosion protection layer 20 and the pipe insulation layer 22, or between the corrosion protection layer 20 and steel pipe 14, such that layers 20, 22 are not necessarily in direct contact with one another, or such that layer 20 is not necessarily in direct contact with the outer surface 16 of pipe 14. However, the positions of the layers 20, 22 relative to one another and relative to pipe 14 remain the same regardless of the presence of other functional layers, i.e. the corrosion protection layer 20 is provided over the outer surface 16 of the steel pipe 14, and the pipe insulation layer 22 is provided over the corrosion protection layer 20.

The factory-applied corrosion protection layer 20 is comprised of fusion bonded epoxy (FBE), and may be applied directly onto the outer surface 16 of pipe 14, for example by spray-coating a layer of epoxy powder onto the outer surface 16 of pipe 14, and then heating the layer of powder to a temperature within the range from about 180-250 degrees Celsius to cure the epoxy. The corrosion protection layer 20 may itself be comprised of one or more layers.

The factory-applied pipe insulation layer 22 is comprised of polymeric pipe insulation. Typically, the pipe insulation will be comprised of a foamed or unfoamed (solid) thermoplastic material such as polyethylene, polypropylene or polystyrene, including homopolymers and copolymers thereof. Where the thermoplastic material is foamed, it may include voids in the form of gas bubbles or in the form of glass or ceramic microspheres, the latter type being referred to as "syntactic" foam. The thickness of the pipe insulation layer 22 is highly variable, and may be in the range from about 15-150 mm.

For example, where the pipe insulation is comprised of polystyrene or a copolymer thereof, the pipe sections 10 and 12 may incorporate any of the layered structures disclosed in U.S. patent application Ser. No. 11/962,772 filed on Dec. 21, 2007, published on Jun. 25, 2009 as US 2009/0159146 A1, and titled "STYRENIC INSULATION FOR PIPE", which is incorporated herein by reference in its entirety.

Alternatively, the pipe insulation may be comprised of any of the high temperature insulations disclosed in U.S. patent application Ser. No. 12/509,138 filed on Jul. 24, 2009, published on Feb. 25, 2010 as US 2010/0043906 A1, and titled "HIGH TEMPERATURE RESISTANT INSULATION FOR PIPE", which is incorporated herein by reference in its entirety. For example, the pipe insulation may comprise at least one layer of solid or foam insulation comprising a high temperature resistant thermoplastic having low thermal conductivity, high thermal softening point, high compressive strength and high compressive creep resistance. The high temperature resistant thermoplastic is selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

Where a high temperature insulation is used as the pipe insulation layer 22, the corrosion protection layer 20 may comprise a FBE with a relatively high glass transition temperature, for example from about 150-160 degrees Celsius.

As shown in FIG. 1a, each of the insulated/coated pipe sections 10, 12 has a bare end portion 24 in which the outer surface of the steel pipe 14 is exposed, and is therefore free of the corrosion protection layer 20, the pipe insulation/coating layer 22, and any other functional layers. The bare end portion 24 extends from the end 15 of pipe 14 to a terminal end of either the corrosion protection layer 20 or the pipe insulation/coating layer 22. The bare end portions 24 are typically formed during the manufacturing process, and are provided so as to avoid damage to the layers 20, 22 when the ends of the insulated/coated pipe sections 10, 12 are heated during welding. The bare end portions 24 may typically have a length of about 6 inches, or about 150-200 mm.

The pipe insulation/coating layer 22 of each pipe section 10, 12 has a terminal end 26 which is spaced from the end 15 of pipe 14. The pipe insulation/coating layer 22 is provided with a chamfer 28 which commences at the terminal end 26 thereof and slopes radially outwardly in a direction away from the end 15 of pipe 14, the chamfer typically being sloped at an angle of from about 30 to 60 degrees. The radially inward-most portion of the chamfer 28, located at the terminal end 26 of the pipe insulation layer 22, is sometimes referred to herein as the "chamfer toe" or "toe". It can be seen that the pipe insulation layer 22 is relatively thin at the terminal end or chamfer toe 26.

Insulated/coated pipe sections 10, 12 are usually constructed such that the terminal end 30 of the corrosion protection layer 20 extends somewhat past the terminal end 26 of the pipe insulation/coating layer 22, such that a distance between the terminal end 30 of the corrosion protection layer 20 and the end 15 of pipe 14 is less than a distance between the terminal end 26 of the pipe insulation/coating layer 22 and the end 15 of pipe 14. Thus, the bare end portion 24 of each insulated pipe section 10, 12 extends from the end 15 of pipe 14 to the terminal end 30 of the corrosion protection layer 20. This construction provides an exposed end portion 32 of the corrosion protection layer 20 which extends beyond the terminal end 26 of the pipe insulation/coating layer 22 toward the end 15 of pipe 14, sometimes referred to herein as the "lip" of the corrosion protection layer 20. The axial length of the exposed end portion 32 of corrosion protection layer 20 is typically about 20-50 mm.

In the method according to the first embodiment of the invention, the insulated/coated pipe sections 10, 12 are provided by the pipe coating facility in the form described above. Prior to joining and application of the field joint insulation system, the bare end portions 24 of the insulated pipe sections 10, 12 may be subjected to a cleaning pretreatment in order to ensure that the outer surfaces of the bare end portions 24 are substantially free from oil, grease, dirt, mill scale, rust, paint and foreign matter. The pretreatment may comprise a blast cleaning of the bare end portions 24, in which case the pretreatment may be performed as an "off-line" step in the factory. Although less preferred for reasons of efficiency, it is possible to pretreat the bare end portions 24 by hand and power tool cleaning.

In an embodiment of the invention, the bare end portions 24 of the insulated pipe sections are thoroughly blast cleaned to a grade of Sa 2.5 to Sa 3.0 such that, when viewed without magnification, the surface is free from visible oil, grease, dirt, mill scale, rust, paint coatings and foreign matter, and such that the bare end portions 24 are of a uniform metallic colour or have only slight traces of contamination. The resulting bare end portions 24 may have a surface cleanliness rating of 1-2, in accordance with ISO 8501 relating to preparation of steel substrates before application of paints and related products. With regard to surface roughness, the cleaning pretreatment of the bare end portions 24 results in a surface roughness Ry (maximum peak-to-valley roughness height) ranging from about 40-80 micrometers, or Rz (average distance between the highest peak and deepest valley) ranging from about 30-60 micrometers.

In order to join the insulated/coated pipe sections 10, 12, they are positioned end-to-end with their annular connection surfaces 18 abutting one another, and are then butt welded together to form a circumferential girth weld. During welding, the ends 15 of steel pipes 14 are heated to a sufficiently high temperature for welding and a molten weld filler metal is applied to join the pipes 14 together and to fill any gaps between the annular connection surfaces 18. After welding, and prior to further processing, the heated area is permitted to cool. The welding step results in the formation of a continuous circumferential weld joint 34 between the annular connection surfaces 18 of steel pipes 14, and this is shown in FIG. 1b. The weld joint 34, together with the bare end portions 24 of insulated pipe sections 10, 12, form a continuous joint area 36 which is defined herein as comprising the entire area over which the outer surfaces of pipes 14 are exposed. The steel pipes 14 of pipe sections 10, 12 are locally heated proximate to their ends 15 during the welding operation. The lengths of bare end portions 24 are of sufficient lengths to prevent excessive heating of the factory-applied FBE layer 20 and the pipe insulation layer 22. In particular, the temperature of the FBE layer 20 is maintained at a temperature below it glass transition temperature during welding, for example less than about 100 degrees Celsius.

After welding, the next step of the method according to the first embodiment of the invention is to apply a liquid epoxy layer 38 to the joint area 36. In the first embodiment of the invention, the liquid epoxy layer 38 is applied over the entire joint area 36 so as to provide this area with a continuous corrosion protection layer. Thus, as shown in FIG. 1c, the liquid epoxy layer 38 is applied as a continuous layer over the weld joint 34 and the bare end portions 24 of pipe sections 10, 12. The liquid epoxy layer 38 may be applied over a period of about 2 minutes and to a thickness of about 100-800 micrometers, for example about 200-500 micrometers.

The liquid epoxy layer 38 overlaps the exposed end portions 32 of corrosion protection layers 20. For example, as shown in FIG. 1c, the continuous liquid epoxy layer 38 may substantially completely cover the exposed end portions 32 of the corrosion protection layer 20. In order to improve adhesion to the liquid epoxy layer 38, the factory-applied corrosion protection layers 20 may be lightly abraded prior to application of the liquid epoxy layer 38, the abrasion being performed either in the factory or in the field.

The liquid epoxy layer 38 is formed by premixing the resin and hardener components of a two-part liquid epoxy primer, and then applying the mixture to the joint area using a spray, brush, roller or pad. The epoxy primer may include a solvent, although 100% solids (solventless) primers are preferred for health and safety reasons. Examples of 100% solids (solventless) epoxy primers which may be used in the method of the invention include epoxy primers produced by Canusa-CPS, such as those known as E Primer, S Primer and P Primer. The liquid epoxy primer is applied as a single layer having a thickness ranging from about 100-800 micrometers, for example from about 250-450 micrometers.

The liquid epoxy primer is substantially uncured during and immediately after application to the joint area 36. In order to prevent displacement of the liquid epoxy layer 38 from the pipe during subsequent processing, it is desired that it be partly cured, for example to the form of a gel, prior to further processing. However, it is also desired that it remain sufficiently uncured that it will react with, and bond to, the subsequently applied adhesive layer. Although the epoxy primer will begin to cure at ambient temperatures of about 10 degrees Celsius or higher, the inventors have found that it is desirable to heat the liquid epoxy primer as it is applied to the steel pipe to ensure that the primer will commence curing at an acceptable rate, and will cure to the consistency of a gel before application of the adhesive layer. The inventors have found that the heating of the liquid epoxy primer is best accomplished by selectively pre-heating the steel pipes within the joint area 36 immediately before application of the epoxy primer. The large thermal mass of the steel pipes ensures effective heating and partial curing of the liquid epoxy layer 38.

For example, the inventors have found that selective, localized preheating of the steel pipes 14 in the joint area 36 to a temperature within the range of about 40-100 degrees Celsius, for example from about 40-90 degrees Celsius, or from about 50-70 degrees Celsius, will cause partial curing of the liquid epoxy primer while maintaining the liquid epoxy layer 38 in a sufficiently uncured state to bond with the subsequently applied adhesive layer. The inventors have found that the combination of selective preheating of the joint area 36, and particularly the use of preheat temperatures which are lower than the glass transition temperature of the factory-applied FBE coating, such as temperatures less than about 100 degrees Celsius, avoids damage to the FBE coating and weakening of the bond between the FBE coating and the outer surface of the steel pipe.

The joint area 36 may be preheated by any suitable means. In order to maximize efficiency, the pipe sections 10, 12 may be advanced through an induction heating apparatus which selectively preheats the steel pipe in the joint area 36 immediately before application of the liquid epoxy primer.

In the first embodiment of the invention, where the pipe sections 10, 12 are welded together prior to application of the liquid epoxy layer 38, the liquid epoxy layer 38 continuously covers the entire joint area 36 and overlaps the exposed end portions 32 of the corrosion protection layer 20. The exposed end portions 32 of the factory-applied FBE corrosion protection layer 20 may be lightly abraded to promote strong adhesion with the liquid epoxy layer 38 and thereby provide the pipe sections 10, 12 with continuous corrosion protection. The liquid epoxy layer 38 does not, however, extend over the chamfer 28 of pipe insulation layer 22 to any significant extent. In fact, the chamfer 28 may be masked, for example with tape, so as to prevent the liquid epoxy primer from overlapping the chamfer 28.

The next step in the method is to apply an adhesive layer 40 over the partially cured liquid epoxy layer 38 and in direct contact therewith. In order to ensure a strong bond between the liquid epoxy layer 38 and the adhesive layer 40, the adhesive layer 40 is applied while the liquid epoxy layer 38 remains in a partially uncured state, and the adhesive layer 40 is typically applied without application of external heating.

As mentioned above, the pre-heating of the steel pipe in joint area 36 causes the liquid epoxy layer 38 to begin curing. The partially cured liquid epoxy layer 38 is in the form of a gel with a tacky outer surface, and the inventors have found that good results are observed where application of the adhesive layer 40 begins while the liquid epoxy is in this gelled state. Typically, the adhesive is applied within about three minutes, for example within about two minutes, after the application of the liquid epoxy layer 38 is completed.

The adhesive layer 40 is advantageously applied over substantially all portions of the joint area 36 which are covered by the liquid epoxy layer 38, i.e. such that the adhesive layer 40 completely covers the liquid epoxy layer 38. In the first embodiment of the invention, therefore, the adhesive layer 40 covers substantially the entire joint area 36 and substantially completely covers the liquid epoxy layer 38, and this is shown in FIG. 1d.

The adhesive layer 40 is formed by spraying a powdered adhesive directly onto the partially cured liquid epoxy layer 38. The particles of the adhesive may have a mesh size of from about 50-350 micrometers, or from about 50-300 micrometers. The adhesive application time is typically about 2 minutes, and the adhesive application thickness is typically in the range from about 200-500 micrometers.

The adhesive making up adhesive layer 40 is comprised of a polymer having functional groups and having a mutual affinity for the liquid epoxy layer 38 and the subsequently applied thermal insulation/coating layer, described below. The polymer on which the adhesive is based is chosen for its compatibility with the subsequently applied thermal insulation layer. For example, where the thermal insulation layer is comprised of polyethylene, polypropylene, polystyrene or copolymers and blends thereof, the adhesive layer 40 may respectively be comprised of a functionalized copolymer of polyethylene, polypropylene, polystyrene, or copolymers and blends thereof. In some embodiments of the invention, the adhesive polymer or copolymer is functionalized by maleic anhydride or glycidyl groups. The functionalities of the adhesive layer are somewhat specific to the chemical compositions of the underlying liquid epoxy layer 38 and the subsequently applied thermal insulation/coating layer.

In embodiments of the invention where the thermal insulation/coating layer is comprised of polyethylene or a copolymer thereof, the adhesive may comprise a maleic anhydride functionalized ethylene copolymer. In embodiments of the invention where the thermal insulation layer is comprised of polypropylene or a copolymer thereof, the adhesive may comprise a maleic anhydride functionalized propylene copolymer. In embodiments of the invention where the thermal insulation layer comprises polystyrene or a copolymer thereof, the adhesive layer may comprise a maleic anhydride functionalized polyolefin copolymer or a styrene-maleic anhydride copolymer, either of which may be blended with polystyrene copolymer.

Immediately following the application of the adhesive layer 40, the joint area 36 is heated in order to melt and coalesce the adhesive particles of the adhesive layer 40. Heating also causes the adhesive layer 40 to react with and become firmly bonded to the liquid epoxy layer 38 at the interface of layers 38 and 40, causes the adhesive layer 40 to become activated for strong bonding to the subsequently applied thermal insulation/coating layer, and also accelerates further curing of the liquid epoxy layer 38.

The joint area 36 is heated so as to selectively heat the liquid epoxy and adhesive layers 38, 40 to a temperature sufficient to melt and coalesce the adhesive particles while minimizing the temperature increase of the underlying steel pipes 14 in the joint area 36. The temperature and time of heating are dependent on a number of factors. The inventors have found that heating the adhesive layer 40 to a temperature within the range from about 100-160 degrees Celsius (at the outer surface of the adhesive layer 40) for a period of about 1-2 minutes is usually sufficient to melt and coalesce the adhesive particles while maintaining the underlying steel pipe at a temperature below the glass transition temperature of the factory-applied FBE coating 20, more typically at a temperature below about 100 degrees Celsius, for example within the range from about 40-90 degrees Celsius.

The inventors have found that the liquid epoxy and adhesive layers 38, 40 may conveniently be heated by infrared radiation, for example by infrared panel heaters. For example, the joined pipe sections 10, 12 may be passed through an annular infrared heater located immediately downstream of the station at which the adhesive layer 40 is applied. Because the infrared radiation is directed at the outer surface of the adhesive layer 40, it heats the adhesive layer 40 and the liquid epoxy layer 38 without excessively heating the underlying steel pipe 14.

The next step in the method is to prepare the joint area 36 and the chamfers 28 for the application of a continuous layer of joint insulation 42. If the chamfers 28 were masked prior to application of the liquid epoxy layer 38, they are unmasked at this stage. The chamfers 28 and the outer surface of the adhesive layer 40 are then preheated prior to application of the joint insulation layer 42. The preheating is performed so as to avoid increasing the temperature of the steel pipe 14 and the temperature of the factory-applied FBE coating to the glass transition temperature of the FBE coating 20, while promoting sufficient adhesion of the joint insulation layer 42 to the underlying layers to which it is applied.

The chamfers 28 are heated to a temperature within the range of about 140-200 degrees Celsius (measured at the outer surface of each chamfer 28) over a period of about 2-3 minutes, with the result that the outer 2-3 mm of the chamfer becomes melted. The joint area 36 is heated to a temperature within the range of about 100-160 degrees Celsius (measured at the outer surface of the adhesive layer 4) for a period of about 1-2 minutes. In order to ensure that the chamfers 28 and the joint area 36 are all at the desired temperature at the commencement of injection molding, the chamfers 28 and the joint area 36 are heated simultaneously, for example by infrared heaters. To prevent excessive heating of the steel pipes 14, the joint area 36 may be heated toward the end of the chamfer preheating cycle, i.e., the preheating of the joint area is begun about 1 minute after the preheating of the chamfers.

The joint insulation/coating layer is then applied over the preheated joint area 36 and over the preheated chamfers 28 so as to provide a continuous field joint coating of substantially the same thickness as the factory-applied insulation layer 22, which is highly variable and may be from 15-150 mm. As shown in the drawings, the joint insulation/coating layer 42 may overlap the outer surface of the factory-applied pipe insulation layer 22 in areas proximate to the chamfers 28. Typically, the joint insulation layer 42 may be applied by an injection molding process in which an annular mold is applied over the joint area and filled with the thermoplastic resin.

The insulation is applied in a molten state, for example at a temperature within the range of about 180-220 degrees Celsius, depending on the polymer used in the insulation layer 22. As the insulation is applied some heat is transferred to the chamfers 28, the adhesive layer 40, the liquid epoxy layer 38, and the underlying steel pipe 14. However, the inventors have found that the temperature of the steel pipe 14 and the factory-applied FBE coating 20 remain below the glass transition temperature of the FBE and that the steel pipe 14 acts as a heat sink to rapidly dissipate the heat of the insulation layer 42. The inventors have observed that the steel pipe 14 may reach a maximum temperature of about 100 degrees Celsius for a brief time during or immediately after injection molding of the insulation layer 42, but that this does not negatively affect the bond between the factory-applied FBE coating 20 and the underlying steel pipe 14, and does not heat the FBE coating 20 above its glass transition temperature.

The joint insulation layer 42 may be of the same or different composition from the factory-applied pipe insulation layer 22, and may be comprised of a foamed or unfoamed (solid) thermoplastic material such as polyethylene, polypropylene or polystyrene, including homopolymers and copolymers and blends thereof, as described above for the insulation layer 22. Where the thermoplastic material is foamed, it may include voids in the form of gas bubbles or in the form of glass or ceramic microspheres, the latter type being referred to as "syntactic" foam.

Following application of the joint insulation layer 42, the completed field joint 44 is allowed to cool to a temperature suitable for reeling, storage or deployment of the pipeline. For example, as mentioned above, the field joint 44 may be allowed to cool to about 80 degrees Celsius or lower before pipe sections 10, 12 are reeled onto a lay vessel.

A method according to a second embodiment of the invention is now described below with reference to FIGS. 2a to 2e. The following method is designed to reduce the number of steps which are performed in the field. In the following description of the second embodiment, the insulated pipe sections 10, 12 shown in FIG. 2a are identical to the insulated pipe sections 10, 12 of the first embodiment, and therefore like elements of the second embodiment are identified by like reference numerals.

In the second embodiment of the invention, the liquid epoxy layer 38 is applied to the preheated bare end portions 24 of the insulated pipe sections 10, 12 before they are welded together and before they leave the factory. Thus, in the second embodiment of the invention, the end portion of each insulated pipe section 10, 12 may have the construction shown in FIG. 2b upon leaving the factory, with the liquid epoxy layer applied only to the part of bare end portion 24 which is proximate to the terminal end 30 of the factory-applied corrosion protection layer 20. For convenience, this factory-applied liquid epoxy layer is labelled 38a. The liquid epoxy layer 38a does not cover the entire bare end portion 24 of the insulated pipe section 10, 12, so as to avoid damage to the liquid epoxy layer 38 during the subsequent welding operation.

Figure 2B:
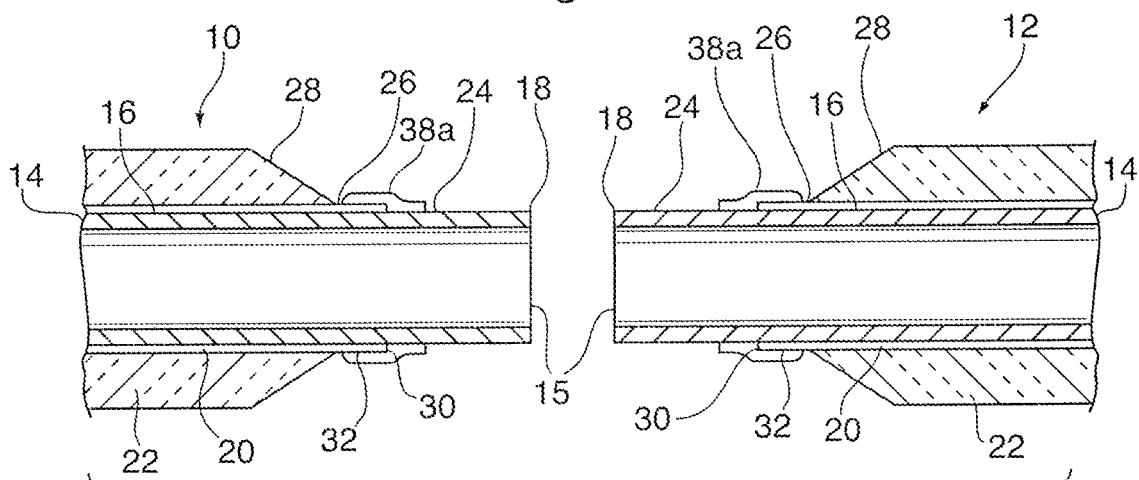

As shown in FIG. 2b, the liquid epoxy layer 38a may overlap and be in contact with the exposed end portion 32 of the factory-applied corrosion protection layer 20, and may substantially completely cover the exposed end portion 32. Aside from the fact that the liquid epoxy layer 38a covers only part of the bare end portion 24, and is applied in the factory, the liquid epoxy layer 38a of the second embodiment is otherwise identical to the liquid epoxy layer 38 of the first embodiment in terms of composition, thickness, method of application, etc.

Figure 2C:
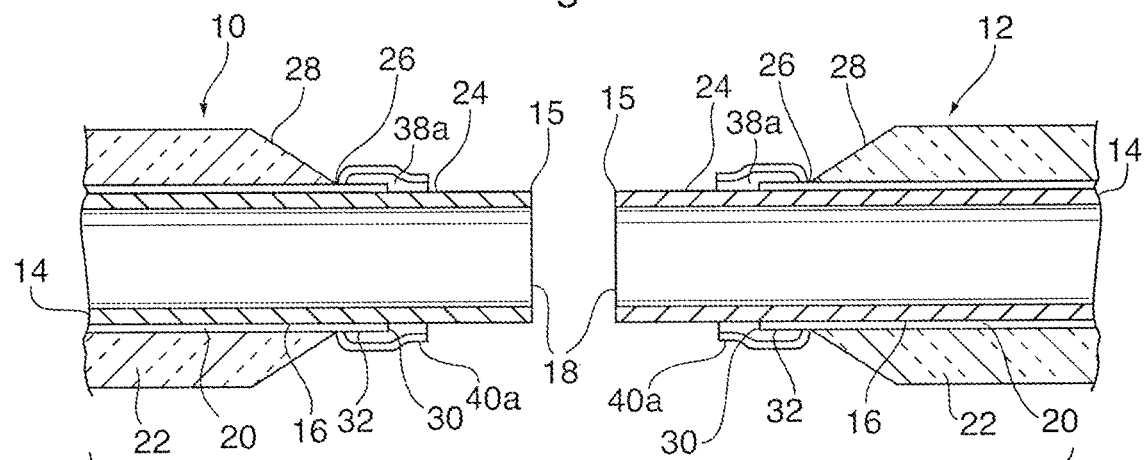

In the method according to the second embodiment, the adhesive layer may also be applied in the factory, and for convenience is labelled with reference numeral 40a. As shown in FIG. 2c, the adhesive layer 40a is also discontinuous, and is applied over the liquid epoxy layer 38a and in contact therewith. For example, the adhesive layer 40a may substantially completely cover the liquid epoxy layer 38a.

In cases where both the liquid epoxy layer 38a and the adhesive layer 40a are applied in the factory, the step of melting and coalescing the adhesive layer 40a may also be performed in the factory. In this case, the adhesive layer 40a of each insulated pipe section 10, 12 is irradiated with infrared radiation as the respective pipe sections 10, 12 move through the pipe coating facility. Aside from the fact that the adhesive layer 40a is discontinuous and is applied in the factory, the adhesive layer 40a of the second embodiment is otherwise identical to the liquid epoxy layer 38 of the first embodiment in terms of composition, thickness, method of application, etc.

Thus, in the second embodiment of the invention, the insulated pipe sections 10, 12 are ready to be welded together when they leave the pipe coating facility and the adhesive layer 40a is pre-activated and ready to bond to the subsequently applied joint insulation layer 42.

The welding operation is illustrated in FIG. 2d, and is exactly as described above in relation to the first embodiment of the invention. The insulated pipe sections 10, 12 are welded together to form a weld joint 34 at the annular connection surfaces 18.

Following the welding step, the joint area 36 and the chamfers are preheated and the joint insulation layer 42 is applied in exactly the same manner as described above in relation to the first embodiment, in order to complete the field joint 44.

It can be seen that the method according to the second embodiment results in a field joint 44 having a discontinuous corrosion protection layer 38 (comprised of two portions 38a) and a discontinuous adhesive layer 40 (comprised of two portions 40a). Thus, while the method according to the second embodiment reduces the number of steps which must be performed in the field, it may not provide the same level of corrosion protection and adhesion as the method according to the first embodiment.

In situations where the individual insulated pipe sections 10, 12 are provided with a factory-applied liquid epoxy layer 38a and a factory-applied adhesive layer 40a, there may arise circumstances where it is desirable to provide the field joint with a continuous corrosion protection layer and a continuous adhesive layer, as in the first embodiment of the invention. The third embodiment of the invention, described below with reference to FIGS. 3a and 3b, is intended to address this situation.

Figure 3A:
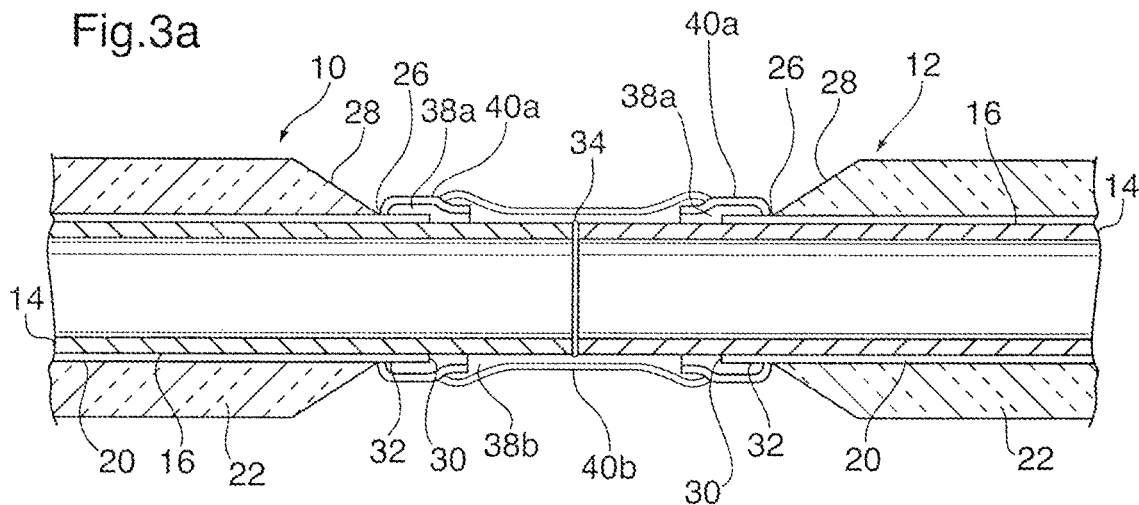
FIGS. 3a to 3b illustrate steps of a method for forming a field joint according to a third embodiment of the invention.
Figure 3B:
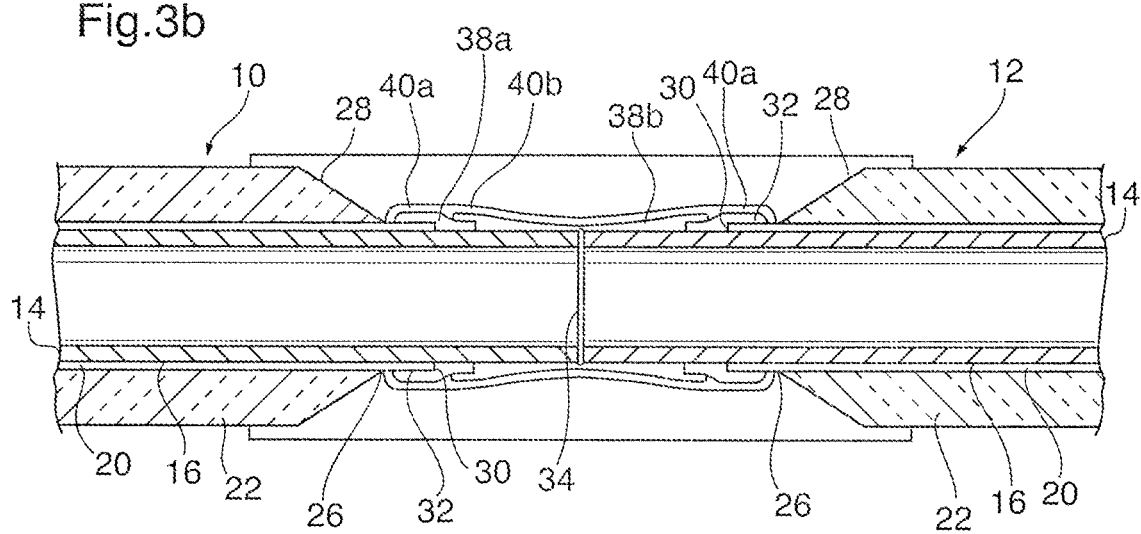

In order to further improve weld joint protection, FIGS. 3a and 3b illustrate steps of a method according to a third embodiment of the invention, in which an additional liquid epoxy layer 38b and an additional adhesive layer 40b are applied continuously over the joint area 36. This variation is now discussed below with reference to FIGS. 2d, 3a and 3b.

After welding of the insulated pipe sections 10, 12 in accordance with the second embodiment of the invention, and as illustrated in FIG. 2d, a continuous liquid epoxy layer 38b is applied over the joint area, and in particular over any areas thereof in which the outer surfaces 16 of pipes 14 are exposed. Therefore, as shown in FIG. 3a, the liquid epoxy layer 38b is applied so as to overlap the discontinuous, factory-applied liquid epoxy and adhesive layers 38a, 40a according to the second embodiment.

Following the application of the continuous liquid epoxy layer 38b, a layer of adhesive 40b is then applied over the continuous liquid epoxy layer 38, and is irradiated by infrared radiation as described above. This is also illustrated in FIG. 3a. Thus, the method according to the third embodiment results in a continuous liquid epoxy layer made up of layers 38a and 38b, and a continuous layer of activated adhesive made up of layers 40a and 40b, so as to protect the pipes 14 from corrosion and provide strong bonding to the subsequently applied joint insulation layer 42. As shown in FIG. 3b, the joint insulation layer 42 is applied exactly as described above in the first and second embodiments, and provides continuous thermal insulation over the joint area 36 and the chamfers 28.

Thus, in conclusion, it can be seen that the method of the present invention permits the formation of a field joint incorporating a corrosion protection coating and an insulating coating, without heating of the factory-applied FBE corrosion protection layer to its glass transition temperature or higher. Thus, the present invention produces a strongly adhering field joint insulation system which protects and insulates the pipe joint while avoiding damage to the existing FBE coating and permitting field jointing to proceed more quickly than in known methods where the pipe and the FBE coating are heated to temperatures in excess of the FBE glass transition temperature.

The invention is further illustrated by the following examples, in which two sections of steel pipe are joined by a field jointing method according to the first embodiment of the invention.

Example 1

Two sections of steel pipe were provided, having a nominal wall thickness of 14.3 mm and a nominal diameter of 273.1 cm. The steel pipes each had a factory-applied FBE corrosion protection coating having a glass transition temperature of 105-107 degrees Celsius, a thickness of about 800 micrometers and a polystyrene insulation layer having a thickness of about 55 cm. The corrosion protection coating was provided directly over the outer surface of the steel pipe and the polystyrene insulation layer was provided directly over the corrosion protection coating. The pipe sections had bared end portions about 15 cm in length, with the ends of the insulation layer being chamfered. The corrosion protection coating extended beyond the toe of the chamfer by about 10 mm.

The bare end portions of the steel pipes were pretreated by blast cleaning to a grade of Sa 2.5, a surface cleanliness rating of 1-2, and a surface roughness Ry (maximum peak-to-valley roughness height) of about 40-70 micrometers. Next, the pipe sections were welded together with a continuous girth weld.

The chamfers were masked and the steel pipe within the pipe joint area was preheated to a temperature of about 55-60 degrees Celsius for about 2 minutes prior to application of the liquid epoxy layer. The liquid epoxy layer was a 100% solids (solventless) epoxy P-Primer produced by Canusa-CPS, and was prepared by premixing the resin and hardener components of the primer immediately before application to the preheated steel pipe. The liquid epoxy primer was applied by a brush to the preheated steel pipe over the entire joint area including the exposed portions of the FBE layer, over a period of about 2 minutes, and to a thickness of about 200-500 micrometers. After application to the preheated steel pipe, the epoxy became partially cured with the outer surface of the liquid epoxy layer having a tacky, gel-like consistency.

While the outer surface of the liquid epoxy layer remained in a partially cured, gel-like state, an adhesive powder comprised of a blend of maleated styrenic and high impact styrenic material was sprayed over the entire outer surface of the liquid epoxy layer at ambient temperature, over a time of about 2 minutes and to a thickness corresponding to a final thickness of about 200-500 micrometers after sintering.

Following application of the adhesive powder, the outer surface of the joint area was heated to a temperature within a range from about 140-160 degrees Celsius for a time of about 2 minutes, using an infrared heater. This resulted in melting and coalescing of the adhesive layer and further hardening (curing) of the underlying liquid epoxy layer, while the temperature of the steel pipe reached a maximum temperature of about 90 degrees Celsius. After heating was discontinued, the adhesive hardened to a continuous, solid layer having a thickness of about 200-500 micrometers.

In preparation for injection molding, the chamfers were unmasked and preheated by infrared heating to a temperature of about 140-160 degrees Celsius and for a time of about 3 minutes. Toward the end of the chamfer preheating cycle, the joint area was heated, also by infrared heating, so as to preheat and activate the adhesive. Preheating of the joint area for a time of about 1 minute resulted in the temperature at the outer surface of the adhesive layer reaching about 140-160 degrees Celsius. During the preheating cycle the temperature of the steel pipe in the joint area reached a maximum of about 90 degrees Celsius.

Immediately after preheating an annular mold was applied over the joint area and the chamfers and polystyrene insulation was injection molded into the space enclosed by the mold, to completely cover the joint area and the chamfers, and overlapping the outer surface of the factory-applied insulation layer. The composition of the polystyrene field joint insulation was the same as that of the factory-applied insulation layer. The temperature of the injected polystyrene field joint insulation was about 180-190 degrees Celsius, and the steel pipe in the joint area reached a maximum temperature of 100 degrees Celsius during the injection molding process. The mold was subsequently removed and the field joint was allowed to air cool to ambient temperature.

The adhesion of the field joint to the underlying pipe was then tested by two methods, a dolly pull off adhesion test and a ring shear adhesion test. The dolly pull off adhesion test (performed using a 1 cm (axial)×1 cm (circumferential) and 30 mm (radial) section of the field joint, drawing normal to the pipe wall (radial)) measured the force required to pull the field joint coating away from the underlying pipe using hydraulic pressure. Adhesion failure occurred at >300 MPa at the interface between the adhesive layer and the field joint insulation layer. The ring shear test in which the interface between the applied coating and the steel pipe is isolated and loaded axially produced adhesion failure at >6 MPa, also at the interface between the adhesive layer and the field joint insulation layer.

Example 2

Two sections of steel pipe were provided, having a nominal wall thickness of 14.3 mm and a nominal diameter of 273.1 cm. The steel pipes each had a factory-applied FBE corrosion protection coating having a glass transition temperature of 105-107 degrees Celsius, a thickness of about 800 micrometers and a polypropylene insulation layer having a thickness of about 55 cm. The corrosion protection coating was provided directly over the outer surface of the steel pipe and the polypropylene insulation layer was provided directly over the corrosion protection coating. The pipe sections had bared end portions about 15 cm in length, with the ends of the insulation layer being chamfered. The corrosion protection coating extended beyond the toe of the chamfer by about 10 mm.

The bare end portions of the steel pipes were pretreated by blast cleaning to a grade of Sa 2.5, a surface cleanliness rating of 1-2, and a surface roughness Ry (maximum peak-to-valley roughness height) of about 40-70 micrometers. Next, the pipe sections were welded together with a continuous girth weld.

The chamfers were masked and the steel pipe within the pipe joint area was preheated to a temperature of about 55-60 degrees Celsius for about 2 minutes prior to application of the liquid epoxy layer. The liquid epoxy layer was a 100% solids (solventless) epoxy P-Primer produced by Canusa-CPS, and was prepared by premixing the resin and hardener components of the primer immediately before application to the preheated steel pipe. The liquid epoxy primer was applied by a brush to the preheated steel pipe over the entire joint area including the exposed portions of the FBE layer, over a period of about 2 minutes, and to a thickness of about 200-500 micrometers. After application to the preheated steel pipe, the epoxy became partially cured with the outer surface of the liquid epoxy layer having a tacky, gel-like consistency.

While the outer surface of the liquid epoxy layer remained in a partially cured, gel-like state, an adhesive powder was sprayed over the entire outer surface of the liquid epoxy layer at ambient temperature, over a time of about 2 minutes and to a thickness corresponding to a final thickness of about 200-500 micrometers after sintering.

Following application of the adhesive powder, the outer surface of the joint area was heated to a temperature within a range from about 160-180 degrees Celsius for a time of about 2 minutes, using an infrared heater. This resulted in melting and coalescing of the adhesive layer and further hardening (curing) of the underlying liquid epoxy layer, while the temperature of the steel pipe reached a maximum temperature of about 100 degrees Celsius. After heating was discontinued, the adhesive hardened to a continuous, solid layer having a thickness of about 200-500 micrometers.

In preparation for injection molding, the chamfers were unmasked and preheated by infrared heating to a temperature of about 140-160 degrees Celsius and for a time of about 3 minutes. Toward the end of the chamfer preheating cycle, the joint area was heated, also by infrared heating, so as to preheat and activate the adhesive. Preheating of the joint area for a time of about 1 minute resulted in the temperature at the outer surface of the adhesive layer reaching about 140-160 degrees Celsius. During the preheating cycle the temperature of the steel pipe in the joint area reached a maximum of about 90 degrees Celsius.

Immediately after preheating an annular mold was applied over the joint area and the chamfers and polypropylene insulation was injection molded into the space enclosed by the mold, to completely cover the joint area and the chamfers, and overlapping the outer surface of the factory-applied insulation layer. The composition of the polypropylene field joint insulation was the same as that of the factory-applied insulation layer. The temperature of the injected polypropylene field joint insulation was about 200-220 degrees Celsius, and the steel pipe in the joint area reached a maximum temperature of 110 degrees Celsius during the injection molding process. The mold was subsequently removed and the field joint was allowed to air cool to ambient temperature.

The adhesion of the field joint to the underlying pipe was then tested by two methods, a dolly pull off adhesion test and a ring shear adhesion test. The dolly pull off adhesion test (performed using a 1 cm (axial)×1 cm (circumferential) and 30 mm (radial) section of the field joint, drawing normal to the pipe wall (radial)) measured the force required to pull the field joint coating away from the underlying pipe using hydraulic pressure. Adhesion failure occurred at >300 MPa at the interface between the adhesive layer and the field joint insulation layer. The ring shear test in which the interface between the applied coating and the steel pipe is isolated and loaded axially produced adhesion failure at >6 MPa, also at the interface between the adhesive layer and the field joint insulation layer.

Although the invention has been described in connection with certain preferred embodiments, it is not limited thereto. Rather, the invention is intended to include all embodiments which may fall within the scope of the following claims.

What is claimed is:

1. A method for forming a field joint between two insulated pipe sections, the method comprising:
   (a) providing a first insulated pipe section and a second insulated pipe section, wherein each of the insulated pipe sections comprises:
      (i) a steel pipe having an outer surface and an end, wherein an annular connection surface is located at said end of the steel pipe,
      (ii) a layer of a fusion bonded epoxy (FBE) provided over the outer surface of the steel pipe, wherein the FBE has a glass transition temperature and wherein a terminal end of the FBE layer is spaced from the end of the pipe; and
      (iii) a pipe insulation layer provided over the FBE layer, wherein the pipe insulation layer comprises a polymeric thermal insulation material, wherein a terminal end of the pipe insulation layer is spaced from the end of the pipe;
   wherein each of the insulated pipe sections has a bare end portion in which the outer surface of the steel pipe is exposed, the bare end portion extending from the end of the steel pipe to the terminal end of the FBE layer;
   wherein each of the insulated pipe sections has an exposed end portion of the FBE layer provided between the terminal end of the pipe insulation layer and the terminal end of the FBE layer; and
   wherein the terminal end of the pipe insulation layer in each of the insulated pipe sections is provided with a chamfer, wherein a toe of the chamfer is located at the terminal end of the pipe insulation layer, and the chamfer extends radially outwardly from the toe in a direction away from the end of the steel pipe;
   (b) welding the steel pipe of the first insulated pipe section to the steel pipe of the second insulated pipe section, so as to form a circumferential weld joint between the annular connection surfaces of the steel pipes, and so as to form a continuous joint area which includes the circumferential weld joint and the bare end portions of the insulated pipe sections;
   (c) applying a layer of liquid epoxy to the joint area, and to the exposed end portions of the FBE layers, such that the liquid epoxy layer is in direct contact with the exposed end portion of the FBE layer of both of the insulated pipe sections, while avoiding substantial overlap with the terminal end of the pipe insulation layer;
   (d) partially curing the liquid epoxy layer by heating the liquid epoxy layer, wherein a temperature of the steel pipe and the FBE layer are maintained at a temperature below the glass transition temperature;
   (e) applying a layer of an adhesive over the liquid epoxy layer and in contact therewith;
   (f) preheating the chamfer of each pipe insulation layer to a temperature within the range of about 140-200 degrees Celsius for a time period of about 2-3 minutes;
   (g) simultaneously with the preheating of the chamfers, preheating the joint area for a time period of about 1-2 minutes to a temperature within a range of about 100-160 degrees Celsius, measured at an outer surface of the adhesive layer, wherein the preheating of the joint area is performed so as to maintain the temperature of the steel pipe and the temperature of the FBE layer below the glass transition temperature, and wherein the preheating of the joint area is begun about 1 minute after the preheating of the chamfers; and
   (h) applying a continuous layer of joint insulation over the preheated joint area and the preheated chamfers, wherein the layer of joint insulation is in contact with the adhesive layer and overlaps with the terminal end of the pipe insulation layer of both the first and the second insulated pipe sections.

2. The method of claim 1, wherein the joint area extends between the terminal end of the FBE layer of the first insulated pipe section and the terminal end of the FBE layer of the second insulated pipe section; and wherein the liquid epoxy layer is applied over said exposed end portion of the FBE layer so as to at least partly cover said exposed portion of the FBE layer.

3. The method of claim 1, wherein the liquid epoxy layer is partially cured by preheating the steel pipe prior to application of the liquid epoxy to a temperature within the range from about 40-100 degrees Celsius.

4. The method of claim 3, wherein an outer surface of the partially cured liquid epoxy layer is in a tacky, gel-like state prior to and during application of the adhesive layer.

5. The method of claim 1, wherein the adhesive is applied to the liquid epoxy layer in solid, particulate form, and wherein step (e) includes heating the adhesive layer to a sufficient temperature to melt and coalesce the adhesive particles while maintaining the steel pipe and the FBE layer at a temperature below the glass transition temperature.

6. The method of claim 5, wherein the adhesive layer is heated during step (e) to a temperature in the range of about 100-160 degrees Celsius to melt and coalesce said adhesive particles.

7. The method of claim 1, wherein the joint insulation layer is applied by injection molding.

8. The method of claim 1, wherein the joint insulation layer comprises a polymer selected from the group consisting of homopolymers of polyethylene, polypropylene or polystyrene, and copolymers of polyethylene, polypropylene or polystyrene.

9. The method of claim 8, wherein the polymer comprising the joint insulation layer is the same as the polymeric thermal insulation material of the pipe insulation layer.

10. The method of claim 1, wherein the liquid epoxy layer is partially cured by preheating the steel pipe prior to application of the liquid epoxy to a temperature within the range from about 50-70 degrees Celsius.

11. The method of claim 1, wherein the chamfer of each pipe insulation layer is masked to prevent contact with the liquid epoxy and is unmasked prior to application of the joint insulation layer.

12. The method of claim 1, wherein the glass transition temperature of the FBE is from about 100 to 160 degrees Celsius.

13. The method of claim 1, wherein the glass transition temperature of the FBE is from 100 to 110 degrees Celsius.

14. The method of claim 1, wherein the said temperature below the glass transition temperature is less than about 100 degrees Celsius.

15. The method of claim 1, wherein the chamfers and the joint area are heated by infrared heating during steps (f) and (g).

* * * * *